W. R. VALENTINE.
ANNEALING LEER FOR GLASS ARTICLES.
APPLICATION FILED JULY 25, 1910.
1,025,936.
Patented May 7, 1912.
6 SHEETS—SHEET 6.
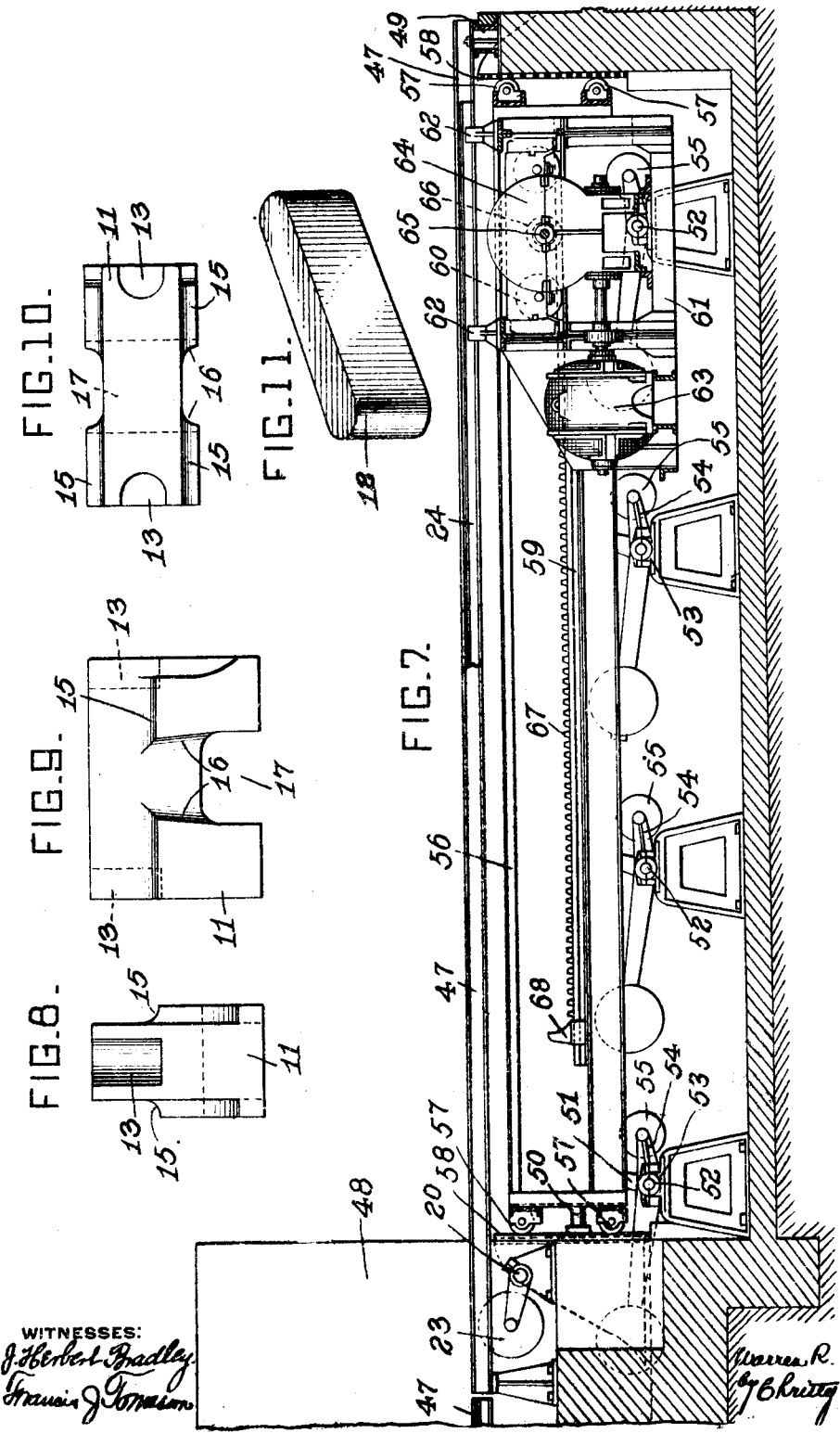

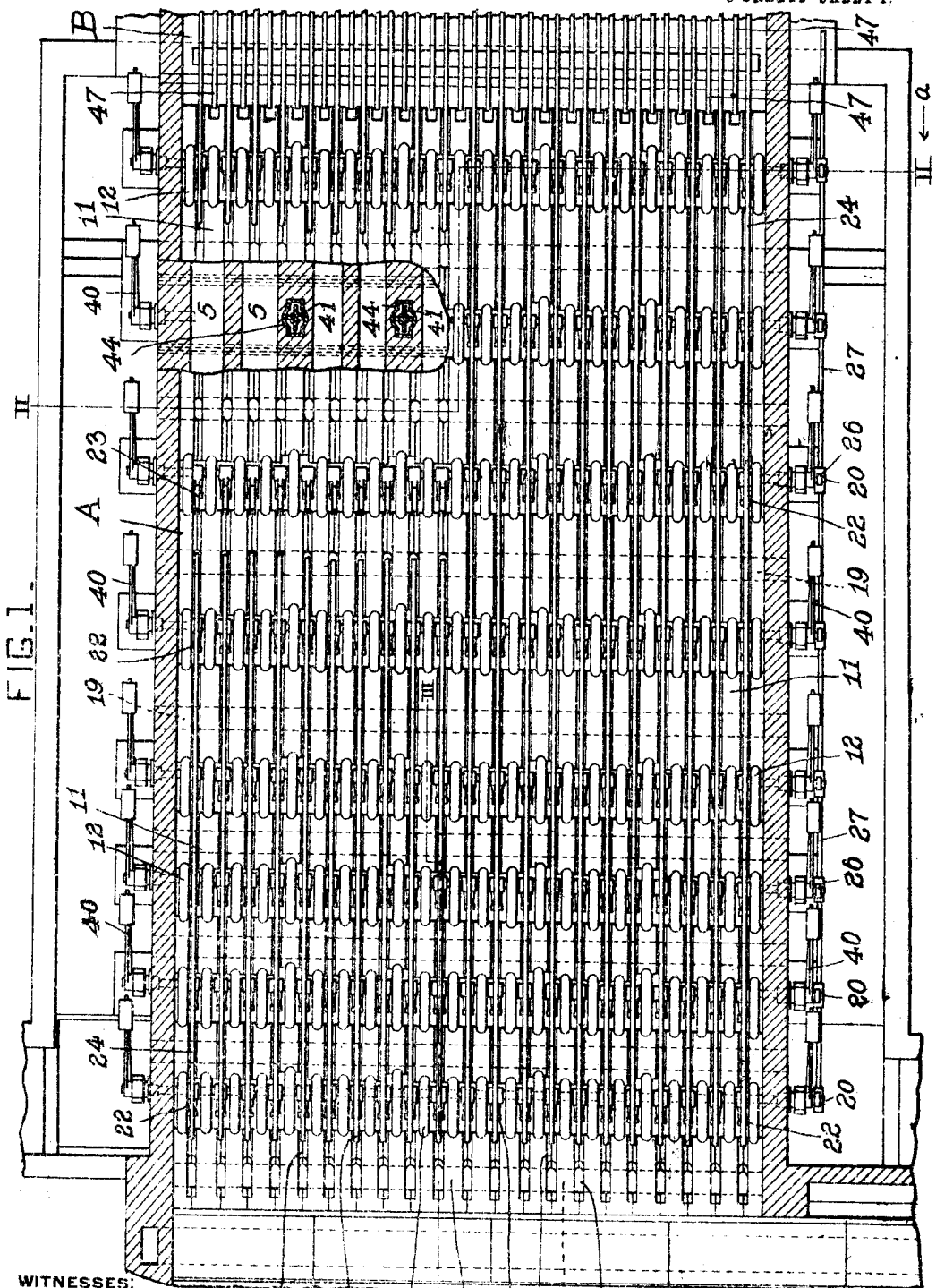

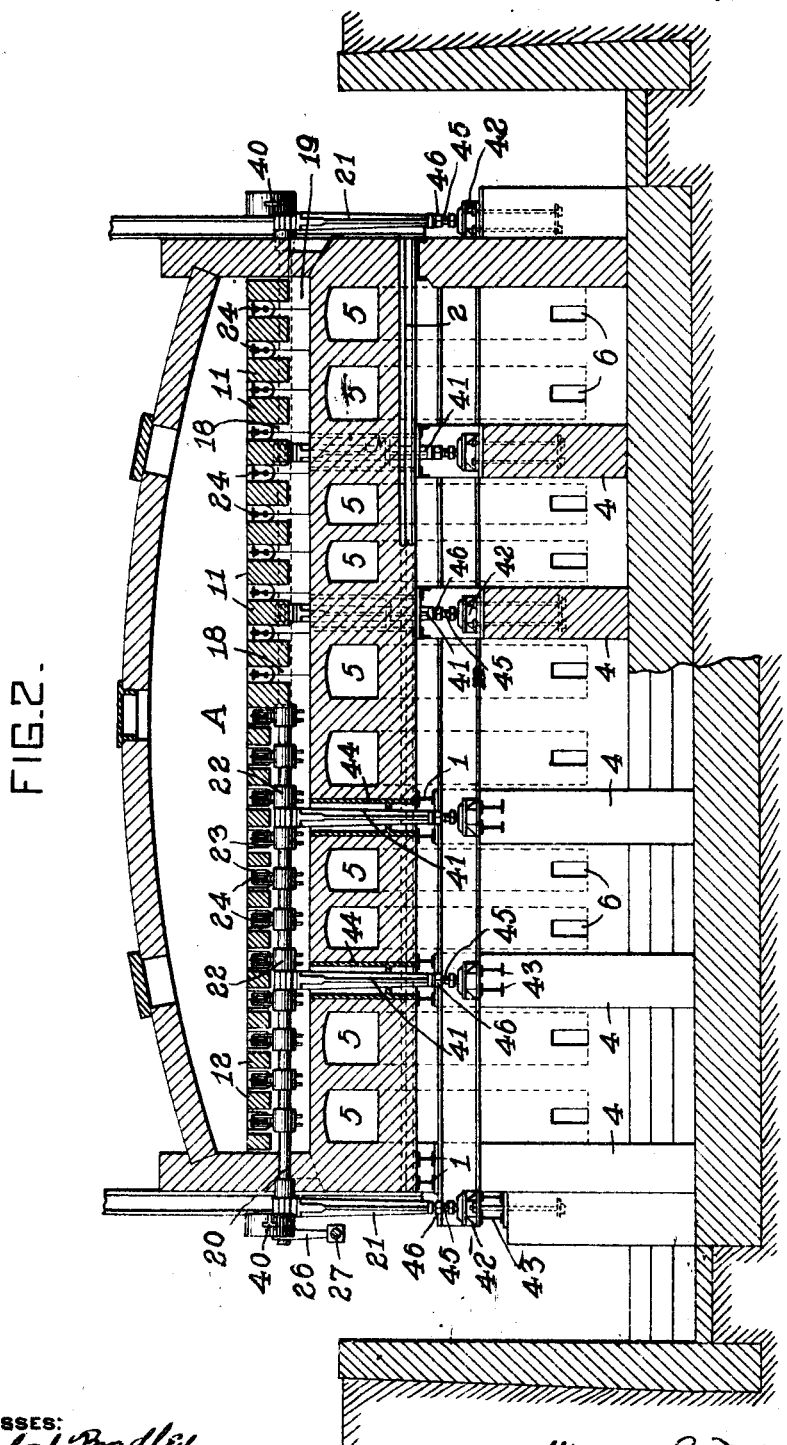

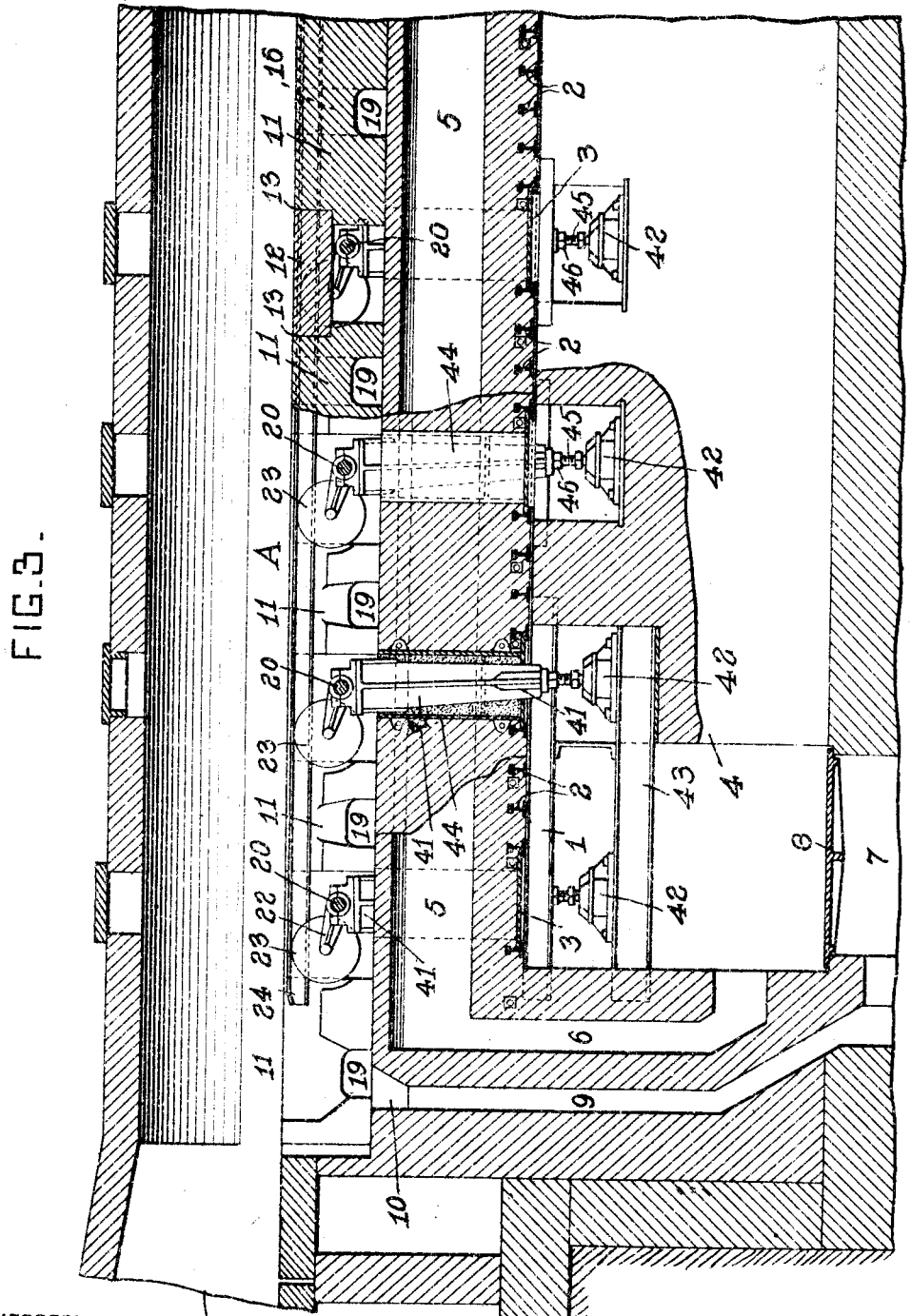

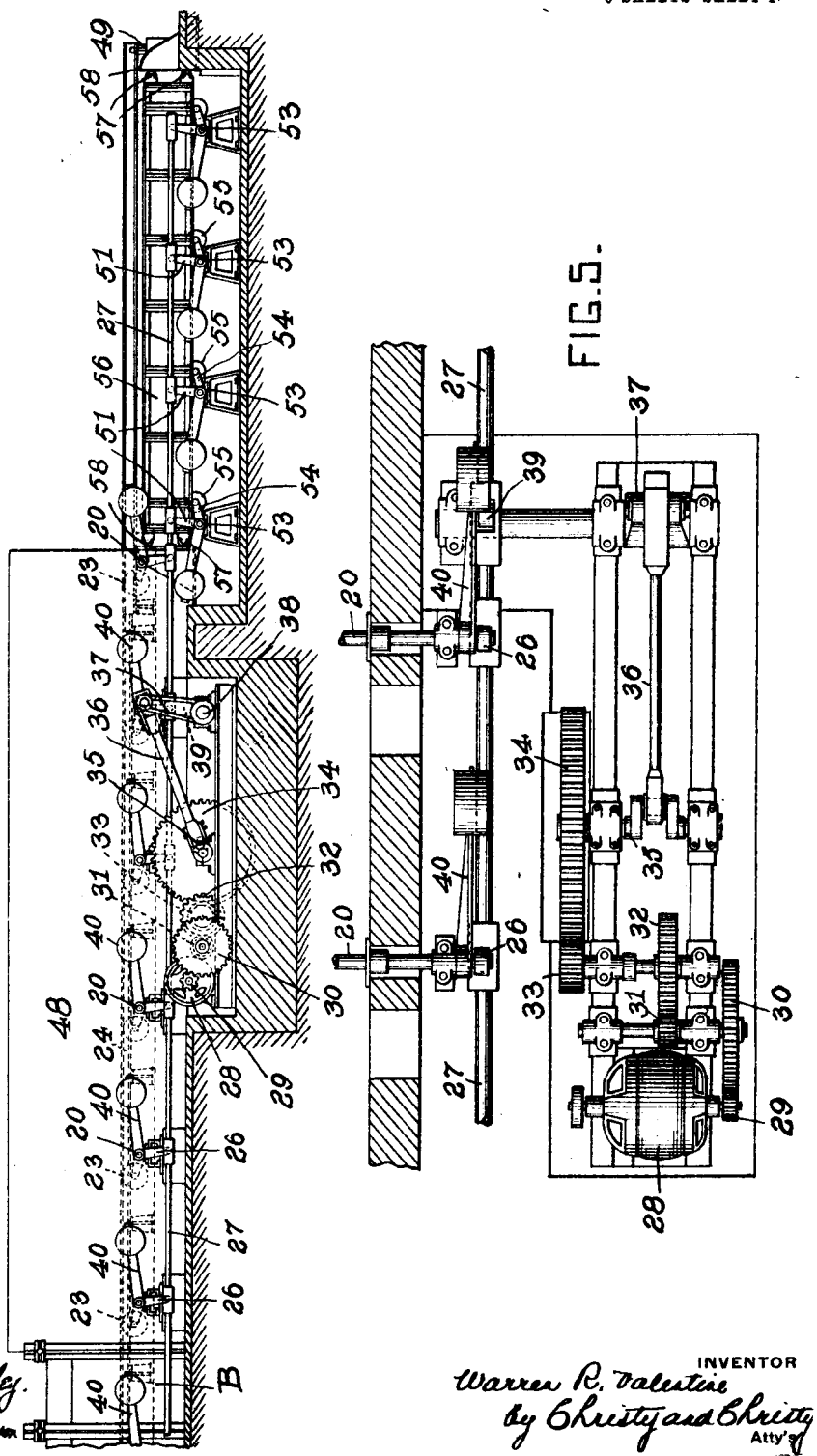

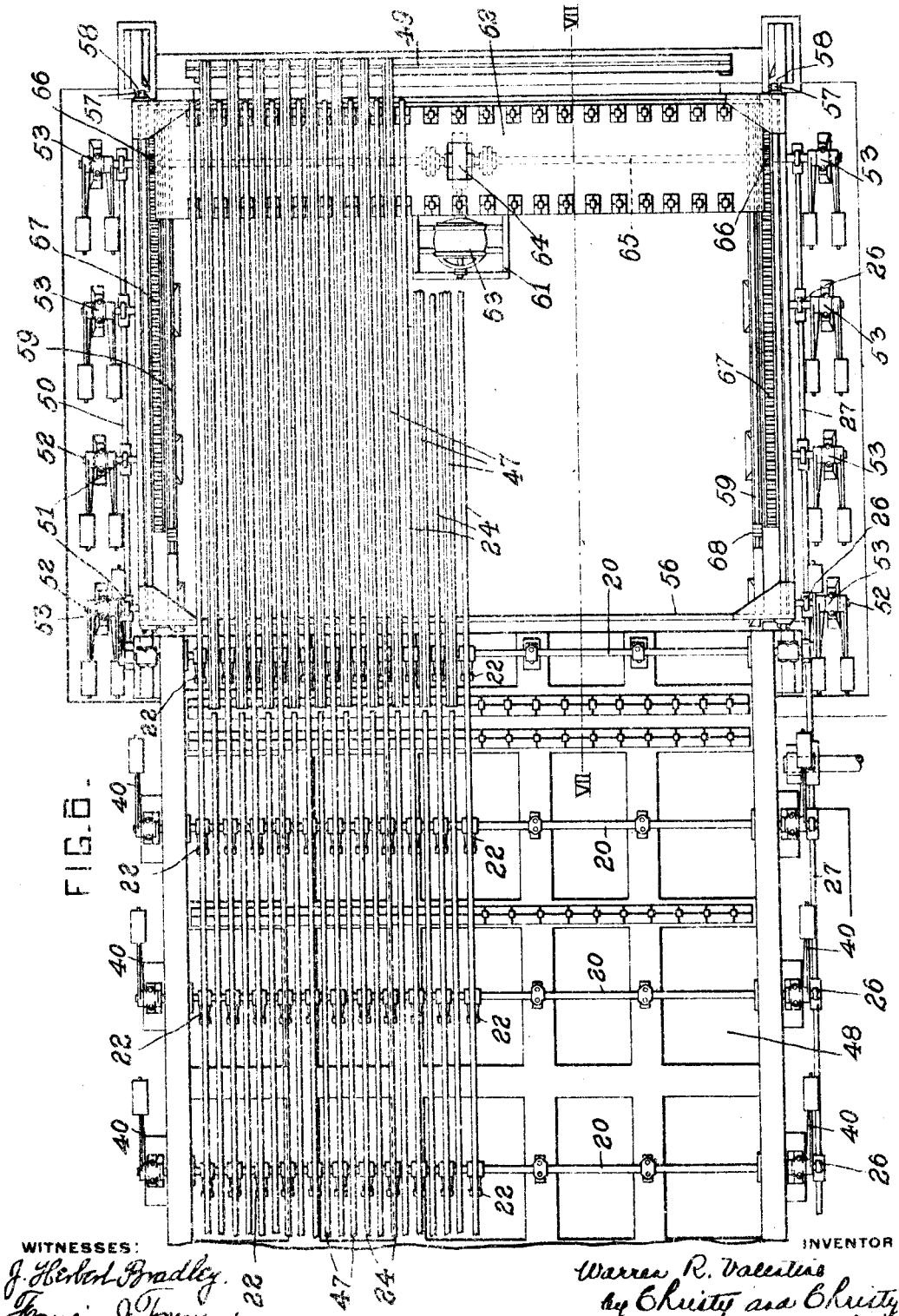

UNITED STATES PATENT OFFICE.

WARREN R. VALENTINE, OF FORD CITY, PENNSYLVANIA.

ANNEALING-LEER FOR GLASS ARTICLES.

1,025,936.   Specification of Letters Patent.   Patented May 7, 1912.

Application filed July 25, 1910. Serial No. 573,596.

*To all whom it may concern:*

Be it known that I, WARREN R. VALENTINE, residing at Ford City, in the county of Armstrong and State of Pennsylvania, a citizen of the United States, have invented or discovered certain new and useful Improvements in Annealing-Leers for Glass Articles, of which improvements the following is a specification.

It is the object of the invention to provide an improved leer particularly suitable for annealing large plates or sheets of glass, together with improved mechanism for transporting the plates through the leer.

In the accompanying drawings there is illustrated a leer embodying the invention in its preferred form.

Figure 1 is a plan view of the floor of the receiving end of the leer, parts being broken away in order to show the heating-flues and portions of the mechanism beneath. Fig. 2 is a transverse sectional elevation on the line II—II of Fig. 1, looking in the direction of the arrow a. Fig. 3 is a partial longitudinal sectional elevation on the line III—III of Fig. 1. Fig. 4 is a side elevation of the discharge end of the leer and of the mechanism for operating the rails for transporting the sheets. Fig. 5 is a detail plan view of the motor and connections for raising and lowering the rails. Fig. 6 is a plan view, parts being broken away, of the mechanism for moving the rails longitudinally. Fig. 7 is a sectional elevation of said rail-moving mechanism, on the line VII—VII of Fig. 6. Figs. 8, 9, and 10 are end, side, and plan views respectively of one of the floor tiles which it is preferred to use in the receiving end of the leer. Fig. 11 is a perspective view of one of the connector-strips for the tiles.

The annealing-chamber is continuous, but by reason of the construction of the floor preferred to be employed at the receiving end, it is preferred to call said receiving end the receiving-portion A, while the rest of the chamber is called the main-portion B. It is preferred to make the receiving-portion A of a length sufficient to accommodate three sheets of glass lying side by side, say fifty feet, while the portion B will be of sufficient length to properly complete the annealing of the glass, say six hundred feet or more. Only the opposite ends of the portion B are shown in the drawings.

The body of the leer may be built of brick, having the supporting beams 1, cross-rails 2 and plates 3. Longitudinal supporting-walls 4 may also be provided beneath the structure, which will be otherwise open underneath for convenient access. Within the brickwork immediately beneath the annealing chamber are longitudinal heating-flues 5, each of which is connected at the entrance end, as by a passage 6, with a source of supply of gaseous fuel, not shown. The heating-flues preferably extend the entire length of the leer, being connected at or near the exit end to a stack-flue, not shown. Underneath the chamber at the entrance end is a sand-pit 7, having a cover 8, and connected by a passage or passages 9 with the transverse slot 10 at the entrance to the chamber.

The floor of the receiving portion A of the chamber is preferably constructed of the tiles 11 and connector-strips 12. As shown in Figs. 8, 9, and 10, each of the tiles has notches 13 in its top face at its opposite ends, to receive the ends of the connector-strips. The tile is cut away longitudinally along its top side edges to form semi-grooves 15, which are connected at their center, by vertical marginal grooves 16, with the transverse channel 17 formed in the under face of the tile. The tiles are laid side by side in transverse rows, the spaces between the rows being bridged by the connector-strips 12, having their opposite ends fitted into the notches 13 in the ends of the tiles in adjacent rows, and the joints being packed with asbestos, if desired. The semi-grooves 15 in the sides of the adjacent tiles in each row form the longitudinal grooves 18 for the movable glass-transporting rails to be presently described, while the transverse channels underneath form a continuous open-ended channel 19 beneath each row of tiles, connected by the vertical passages 16 with the grooves 18 in the upper face of the floor, for the deposit of sand and particles of glass, which may be blown out from the ends of the channels when desired.

Running transversely of the chamber, in the spaces between the rows of tiles and underneath the connector-strips, are the rock-shafts 20. These shafts project through the side-walls of the chamber, and may have bearings in supporting-stands 21. Upon the rock-shafts, in the spaces between the connector-strips and in line with the grooves 18, are fastened the arms 22 carrying the sheaves 23. The peripheries of these sheaves are suitably grooved to receive somewhat loosely the movable glass-transporting rails 24. The rails 24 extend the entire length of the annealing-chamber, and project outwardly from the discharge-end, where they are fastened to the standards 62, (Fig. 7), to be hereinafter described.

Each of the rock-shafts 20 is connected at one end, by an arm 26, to a connecting-rod 27 which extends the entire length of the apparatus. At any suitable point is placed a motor 28, (see Figs. 4 and 5), the shaft of which is connected, as by gearing 29, 30, 31, 32, 33, 34, with the crank-shaft 35, having a connecting-rod 36, the opposite end of which is connected to the arm 37 fastened to the rock-shaft 38. The rock-shaft 38 is connected, as by an arm 39, to the connecting-rod 27. Thus the operation of the motor in opposite directions will alternately elevate and lower all the sheaves and the rails 24 in unison throughout the apparatus. The rock-shafts 20 are preferably provided at their opposite ends with weighted arms 40, to assist in elevating the rails.

Intermediate supports are preferably provided at intervals for the rock-shafts 20. These supports consist of stands 41 adjustably mounted upon supports 42, which are supported beneath the brick floor of the annealing-chamber, in some cases upon beams 43 and in others upon the longitudinal walls 4, as shown in Fig. 3. The stands 41 project upwardly through open iron boxes 44 fitted in the brick-work between the flues 5, (see Fig. 1), and are provided at their upper ends with bearings for the rock-shafts 20. The stands are loosely packed in the boxes with asbestos, and are free to move therein with the expansion and contraction of the floor of the annealing-chamber and the apparatus therein. For that purpose the stands are preferably connected to the supports 42 by a ball and socket joint, and are adjustable vertically by means of the screws 45 having jam-nuts 46. The stands 21 may be made vertically adjustable in the same way.

After the sheets of glass have passed through the receiving-portion A of the annealing-chamber, they will have stiffened to such a degree that the tile floor is no longer necessary. Hence in the main-portion B fixed rails 47 may be provided between the movable rails 24, to support the glass sheets. These fixed rails extend outwardly from the discharge end of the annealing-chamber over an uncovered table 48, Figs. 4 and 6, and on, over the mechanism for longitudinally moving the movable rails, Figs. 6 and 7. Their ends are secured to the beam 49 at the end of the apparatus, and, as the sheets of glass are successively deposited upon the ends of the said rails 47, they are taken therefrom to the cutting table.

The mechanism for shifting the rails 24 longitudinally is shown in Figs. 4, 6, and 7. The last of the rock-shafts 20, at the end of table 48, is connected at the side of the machine opposite the rod 27 with a rearwardly extending connecting-rod 50. The connecting-rod 50 thus moves in unison with the connecting-rod 27. The rods are connected by the arms 51 with the stub rock-shafts 52, mounted in suitable bearings on standards 53, and having arms 54 carrying sheaves 55. The shafts 52 are counterweighted in the same manner as are the shafts 20. Supported upon the sheaves 55 is a platform or frame 56, provided at its ends with wheels 57 running upon suitable vertical guides 58. Through the described connections, as will be apparent, the frame 56 is elevated and lowered in unison with the movable rails 24 by the motor 28.

Near the opposite sides of the frame are mounted the longitudinal rails 59, and thereon is supported by wheels 60 the depending traveling carriage 61. Fastened upon this carriage are the vertical standards 62, which project upwardly between the fixed rails, and to which are fastened the ends of the movable rails 24. Upon the carriage 61 is mounted the motor 63, which serves to drive the carriage longitudinally along the frame. For this purpose the motor-shaft may have a worm meshing with a worm-wheel, both inclosed within the casing 64, the worm-wheel being fastened to the transverse shaft 65. At the opposite ends of the shaft 65 are pinions 66, meshing with longitudinal racks 67 on the frame adjacent to the rail. Thus by operating the motor 63 the carriage will be moved longitudinally along the frame, and the movable rails 24, which extend the entire length of the annealing-chamber, be moved longitudinally for the required distance. Stops 68, may be provided on the rails 59, to limit the movement of the carriage. The free ends of the movable rails 24 at the receiving end are preferably tapered or pointed, in order that they may easily enter the grooved sheaves in their forward movement.

The operation of the apparatus will be apparent to those skilled in the art. Assuming the leer to be empty, and the rails 24 to be in forward and lowered position, a sheet of glass is moved from the tempering-oven, indicated at C, Fig. 3, and laid upon the floor within the annealing-chamber and over the ends of the rails. The motor 28 is then operated, elevating the frame 56 and the rails, thus lifting the sheet of glass off the floor. The motor 63 is then operated, and the rails with the sheet of glass upon them shifted backwardly for a distance a little greater than the width of the sheet. The rails are then lowered to deposit the sheet upon the floor, and are then shifted forwardly under the sheet into position to receive another sheet, and the operation is repeated. Thus the sheets of glass are transported step by step in succession through the annealing-chamber and out upon the ends of the rails 47, from which they are removed, the rails 24 being elevated and shifted backwardly to carry the sheets through the chamber, and then lowered and shifted forwardly to receive each following sheet.

The advantages of the invention will be apparent. The tile floor in the receiving-portion A of the annealing-chamber affords an even support for the glass, which is easily kept clean, and the arrangement is such as to provide for the operation of the moving parts of the apparatus.

The supports for the rock-shafts 29 are all accessible, and can be readily adjusted for maintaining the proper height of the rails. They also have a range of movement which enables them to automatically conform to changes caused by expansion of the floor and of the apparatus in the annealing-chamber.

Only one set of movable rails is employed for lifting and transporting the glass, and by causing the mechanism for shifting the rails longitudinally to move bodily vertically in unison with the rails, the rails are always maintained level throughout their length. The vertically movable parts are all counterweighted, thus economizing the power necessary to operate them.

I claim as my invention:

1. In an annealing leer for glass articles, a floor composed of separated rows of tiles, in combination with connector-strips set into the upper portions of the opposite ends of the tiles in adjacent rows and bridging the space between the rows.

2. In an annealing leer for glass sheets, the combination with a floor composed of tiles arranged transversely side by side, and having their upper side edges cut away to form longitudinal grooves between adjacent tiles, of glass-supporting rails arranged in the grooves, and means for moving the rails vertically.

3. In an annealing leer for glass sheets, the combination with a floor composed of rows of tiles arranged transversely side by side, and having their upper side edges cut away to form longitudinal grooves between adjacent tiles in each row, the grooves in the successive rows being in longitudinal alinement, of longitudinal glass-supporting rails arranged in the alining grooves, and means for moving the rails vertically.

4. In an annealing leer for glass sheets, the combination with a floor composed of separated transverse rows of tiles, and connector-strips set into the upper portions of the opposite ends of the tiles in adjacent rows and bridging the spaces between the rows, of transverse rock-shafts arranged in the spaces beneath the connector-strips, arms fastened to the rock-shafts between the connector-strips, longitudinal grooves in the tiles in alinement with the arms, longitudinal glass-supporting rails carried by the arms and arranged in the grooves, and means for turning the rock-shafts in unison.

5. In an annealing leer for glass sheets, the combination with a series of transverse rock-shafts arranged within the annealing-chamber, arms on the rock-shafts, and a series of longitudinal glass-supporting rails carried by the arms, of supports for the rock-shafts adjustably mounted and accessible beneath the annealing-chamber and projecting through the floor into the annealing-chamber.

6. In an annealing leer for glass articles, the combination with an annealing chamber, and glass-transporting mechanism arranged therein, of supports for the glass-transporting mechanism adjustably mounted beneath the chamber and projecting through the floor into the chamber.

7. In an annealing leer for glass articles, the combination with an annealing chamber, and glass-transporting mechanism arranged therein, of supports for the glass-transporting mechanism pivotally mounted beneath the chamber and projecting through the floor into the chamber.

8. In an annealing leer for glass articles, the combination with an annealing chamber, and glass-transporting mechanism arranged therein, of stands arranged beneath the chamber, supports for the glass-transporting mechanism pivotally mounted on the stands and projecting through the floor into the chamber, and means for adjusting the supports vertically.

9. In an annealing leer for glass sheets, the combination with an annealing-chamber, and a series of rails extending longitudinally through the chamber, of means for moving the rails vertically, means for shifting the rails longitudinally, and means for moving the rail-shifting means vertically in unison with the rails.

10. In an annealing leer for glass sheets, the combination with an annealing-chamber, and a series of rails extending longitudinally through the chamber, of means for shifting the rails longitudinally, and means for vertically moving the rails and the rail-shifting means.

11. In an annealing leer for glass sheets, the combination with an annealing-chamber, a series of vertically movable rail-supports arranged therein, and a series of rails longitudinally movable upon said supports and projecting outwardly from the chamber, of a vertically and longitudinally shiftable support arranged outside of the chamber and secured to the projecting ends of the rails, means for longitudinally shifting the said support and the rails, and means for vertically moving the rail-supports, the rails, and the rail-shifting means.

12. In an annealing leer for glass sheets, the combination with an annealing-chamber, a series of vertically movable rail-supports arranged therein, and a series of rails longitudinally movable upon said supports and projecting outwardly from the chamber, of a vertically movable frame arranged outside of the chamber, a longitudinally shiftable carriage mounted on the frame and secured to the projecting ends of the rails, means for longitudinally shifting the carriage and the rails, and means for vertically moving the rail-supports, the frame, and the rails.

13. In an annealing leer for glass sheets, the combination with an annealing-chamber, a series of transverse rock-shafts within and without the chamber, and a longitudinal series of rails supported by the rock-shafts within the chamber and having their ends fastened to a longitudinally shiftable carriage supported by the rock-shafts outside the chamber, of means for shifting the carriage, means for operating the rock-shafts in unison, and counterweights secured to the rock-shafts.

14. In an annealing leer for glass sheets, the combination with an annealing chamber and grooved sheaves arranged therein, of rails supported by the sheaves and having tapered ends, and means for moving the rails longitudinally into and out of the grooves in the sheaves.

In testimony whereof, I have hereunto set my hand.

WARREN R. VALENTINE.

Witnesses:
ALICE A. TRILL.
MARSHALL A. CHRISTY.